US008032013B2

(12) United States Patent
Yoo et al.

(10) Patent No.: US 8,032,013 B2
(45) Date of Patent: Oct. 4, 2011

(54) RECORDING MEDIUM HAVING DATA STRUCTURE FOR MANAGING REPRODUCTION OF TEXT SUBTITLE AND RECORDING AND REPRODUCING METHODS AND APPARATUSES

(75) Inventors: Jea Yong Yoo, Seoul (KR); Kang Soo Seo, Kyunggi-do (KR); Byung Kin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 871 days.

(21) Appl. No.: 10/960,486

(22) Filed: Oct. 8, 2004

(65) Prior Publication Data

US 2005/0078948 A1 Apr. 14, 2005

(30) Foreign Application Priority Data

Oct. 14, 2003 (KR) .................. 10-2003-0071396

(51) Int. Cl.
  *H04N 5/89* (2006.01)
  *H04N 5/84* (2006.01)
  *H04N 5/92* (2006.01)
  *H04N 5/77* (2006.01)
  *H04N 5/82* (2006.01)

(52) U.S. Cl. ........ 386/336; 386/335; 386/337; 386/224; 386/246

(58) Field of Classification Search .............. 386/95, 386/111–112, 45, 69, 98, 336, 335, 337, 386/224, 246
See application file for complete search history.

(56) References Cited

U.S. PATENT DOCUMENTS

| | | | |
|---|---|---|---|
| 4,040,088 A | 8/1977 | Hannan | |
| 5,519,443 A | 5/1996 | Salomon et al. | |
| 5,745,454 A | 4/1998 | Yokota | |
| 5,949,752 A * | 9/1999 | Glynn et al. | 369/275.3 |
| 5,999,255 A | 12/1999 | Dupée et al. | |
| 6,115,077 A * | 9/2000 | Tsukagoshi | 348/607 |
| 6,204,883 B1 | 3/2001 | Tsukagoshi | |
| 6,219,043 B1 * | 4/2001 | Yogeshwar et al. | 341/55 |
| 6,253,221 B1 | 6/2001 | Kim | |
| 6,275,457 B1 | 8/2001 | Maeda | |
| 6,288,900 B1 | 9/2001 | Johnson et al. | |
| 6,381,513 B1 | 4/2002 | Takase et al. | |
| 6,452,609 B1 | 9/2002 | Katinsky et al. | |
| 6,477,185 B1 | 11/2002 | Komi et al. | |
| 6,763,178 B1 * | 7/2004 | Suzuki et al. | 386/95 |
| 7,197,234 B1 | 3/2007 | Chatterton | |
| 7,324,119 B1 | 1/2008 | Puri et al. | |

(Continued)

FOREIGN PATENT DOCUMENTS

CN 1153981 7/1997

(Continued)

OTHER PUBLICATIONS

International Search Report, dated Nov. 25, 2004.

(Continued)

*Primary Examiner* — Helen Shibru
(74) *Attorney, Agent, or Firm* — Harness, Dickey & Pierce, P.L.C.

(57) ABSTRACT

In the data structure for managing reproduction of text subtitle data, a recording area stores a main file and at least one separate text file. The main file includes multiplexed audio and video data streams, and the text subtitle file includes a single text subtitle stream.

18 Claims, 11 Drawing Sheets

U.S. PATENT DOCUMENTS

| | | | |
|---|---|---|---|
| 7,558,467 B2 | 7/2009 | Seo et al. | |
| 2001/0030710 A1* | 10/2001 | Werner | 348/467 |
| 2002/0006271 A1 | 1/2002 | Winter et al. | |
| 2002/0106193 A1 | 8/2002 | Park et al. | |
| 2002/0135607 A1 | 9/2002 | Kato et al. | |
| 2002/0194618 A1 | 12/2002 | Okada et al. | |
| 2003/0021586 A1 | 1/2003 | Suh | |
| 2003/0156504 A1* | 8/2003 | Kanegae et al. | 369/30.08 |
| 2003/0190147 A1 | 10/2003 | Lee | |
| 2003/0202431 A1 | 10/2003 | Kim et al. | |
| 2003/0235406 A1 | 12/2003 | Sea et al. | |
| 2004/0001699 A1 | 1/2004 | Sea et al. | |
| 2004/0081434 A1* | 4/2004 | Jung et al. | 386/95 |
| 2004/0101285 A1 | 5/2004 | Seo et al. | |
| 2005/0008339 A1* | 1/2005 | Kuroiwa et al. | 386/96 |
| 2005/0019007 A1 | 1/2005 | Kato et al. | |
| 2005/0105888 A1 | 5/2005 | Hamada et al. | |
| 2005/0147387 A1 | 7/2005 | Seo et al. | |
| 2005/0201718 A1 | 9/2005 | Kato | |
| 2006/0098936 A1 | 5/2006 | Ikeda et al. | |
| 2006/0146660 A1 | 7/2006 | Ikeda et al. | |
| 2006/0153532 A1 | 7/2006 | McCrossan et al. | |
| 2006/0156358 A1* | 7/2006 | Adolph et al. | 725/90 |
| 2006/0288302 A1 | 12/2006 | Yahata et al. | |
| 2007/0127885 A1 | 6/2007 | Seo et al. | |
| 2008/0253734 A1 | 10/2008 | Kang et al. | |

FOREIGN PATENT DOCUMENTS

| | | |
|---|---|---|
| CN | 1385857 | 12/2002 |
| CN | 1428770 | 7/2003 |
| EP | 0737009 | 10/1996 |
| EP | 0737979 | 10/1996 |
| EP | 0 791 925 A2 | 8/1997 |
| EP | 0 942 609 | 9/1999 |
| EP | 1 173 031 A1 | 1/2002 |
| EP | 1 198 132 | 4/2002 |
| EP | 1204280 | 5/2002 |
| EP | 1 280 347 | 1/2003 |
| EP | 1 408 505 A1 | 4/2004 |
| EP | 1614108 | 1/2006 |
| EP | 1 643 765 A1 | 4/2006 |
| GB | 1 556 366 | 11/1979 |
| GB | 1 586 431 | 3/1981 |
| JP | 60-179261 | 9/1985 |
| JP | 08-273304 | 10/1996 |
| JP | 09-035458 | 2/1997 |
| JP | 11-176137 | 7/1999 |
| JP | 2001-135066 | 5/2001 |
| JP | 2002-025197 | 1/2002 |
| JP | 2002-101389 | 4/2002 |
| JP | 2002-158971 | 5/2002 |
| JP | 2002-247526 | 8/2002 |
| JP | 2003-134440 | 5/2003 |
| JP | 2003-249057 | 9/2003 |
| JP | 2003-283942 | 10/2003 |
| JP | 2007/507973 T | 3/2007 |
| RU | 2196389 | 1/2003 |
| RU | 2229174 | 4/2004 |
| WO | WO 99/22516 | 5/1999 |
| WO | WO02075739 A1 | 9/2002 |
| WO | WO 03/056560 A1 | 7/2003 |
| WO | WO 2004/030356 | 4/2004 |
| WO | WO 2004/034398 | 4/2004 |
| WO | WO 2004/036574 | 4/2004 |
| WO | WO 2004/056105 A1 | 7/2004 |
| WO | WO 2004/066281 | 8/2004 |
| WO | WO 2004/090885 | 10/2004 |
| WO | WO 2004/093064 | 10/2004 |
| WO | WO 2004/098186 A1 | 11/2004 |
| WO | WO 2005/07394 A2 | 8/2005 |
| WO | WO 2005/074394 A2 | 8/2005 |
| WO | WO 2005/074399 | 8/2005 |

OTHER PUBLICATIONS

Synchronized Multimedia Integration Language (SMIL) 1.0 Specification, Jun. 15, 1998, 38 pages.
European Search Report dated Jan. 31, 2005.
"White paper Blu-Ray Disc Format: 2.B Audio Visual Application format specifications for BD-ROM", Mar. 2005.
English translation of Russian Office Action dated Oct. 30, 2008, for counterpart Russian Application No. 2006116489.
Office Action for corresponding Russian Application No. 2006116489/28(017941) dated Feb. 18, 2009 and English translation thereof.
Office Action for corresponding Japanese Application No. 2006-535261 dated May 8, 2009 and English translation thereof.
U.S. Office Action dated Aug. 31, 2009 corresponding to counterpart U.S. Appl. No. 10/898,207.
U.S. Office Action dated Sep. 3, 2009 corresponding to counterpart U.S. Appl. No. 10/960,485.
Notice of Allowance dated Jun. 3, 2009 corresponding to counterpart European application No. 05721896.8-2223.
Information technology—Generic coding of moving pictures and associated audio information : Systems; Second edition Dec. 1, 2000.
Office Action for corresponding Russian Application No. 2006116506/28(017958) dated May 18, 2009 and English translation thereof.
Japanese Office Action for Application No. 2006-535261 dated Sep. 15, 2009 (with English translation).
Notice of Allowance dated May 28, 2009 for corresponding Russian Application No. 2006116489/289(017941).
Supplementary European Search Report for Application No. EP 04 77 4776 dated Dec. 28, 2009.
WC3 Synchronized Multimedia Integration Language (SMIL) 1.0 Specification, Internet Citation, Jun. 15, 1998.
Blu-ray Disc White Paper Blu-ray Disc Format 2.B Audio Visual Applications, Internet Citation, Aug. 2004.
U.S. Office Action dated Feb. 22, 2010 for U.S. Appl. No. 10/960,485.
Chinese Office Action dated Jan. 29, 2010 in Chinese Application No. 2004-80030092.2.
Japanese Office Action mailed Mar. 12, 2010 for Japanese Application No. 2006-535258.
U.S. Office Action dated Nov. 25, 2009 for U.S. Appl. No. 11/070,238.
Japanese Notice of Allowance dated Nov. 30, 2010 for JP Application No. 2006-535258.
US Office Action dated Feb. 1, 2011 in U.S. Appl. No. 10/960,485.
ETSI EN 300 743 V1.2.1., Digital Video Broadcasting (DVB), Subtitling Systems, Oct. 2002.
ETSI EN 300 472 V1.3.1., Digital Video Broadcasting (DVB), Specification for Conveying ITU-R System B. Teletext in DVB Bitstreams, May 2003.
European Search Report for corresponding application 04774324.0, dated Aug. 3, 2007.
European Telecommunications Standards Institute. "Digital Video Broadcasting (DVB)" (Jun. 2002).
Chinese Office Action dated May 9, 2008.
Russian Office Action dated Aug. 20, 2008 corresponding to Application No. 2006116506/28(017958).

* cited by examiner

RECORDING MEDIUM HAVING DATA STRUCTURE FOR MANAGING REPRODUCTION OF TEXT SUBTITLE AND RECORDING AND REPRODUCING METHODS AND APPARATUSES

FOREIGN PRIORITY DATA

The subject application claims priority under 35 U.S.C. 119 on Korean Application No. 10-2003-071396 filed Oct. 14, 2003; the entire contents of both applications are hereby incorporated by reference.

BACKGROUND OF THE INVENTION

1. Field of the Invention

The present invention relates to high density recording media such as optical discs, and in particular, blu-ray read-only discs.

2. Description of the Related Art

Optical discs that are capable of storing large amounts of high-quality video and audio data, have been available on the market. The digital versatile disc (DVD) is one example of such an optical disc. Recently, DVD players and DVD recorders have been available on the market and have become one of the most popular consumer electronic products.

Subtitle data that is to be displayed on screen as characters or logo during playback of video data (e.g., a movie) is generally recorded on a DVD in the bitmapped format. While the main video data recorded on the DVD is reproduced, the bitmap-formatted subtitle data is read out from the DVD and output to an external display device such as a TV after a series of signal processing steps so that the bitmap subtitle is displayed on the screen of the external device. In this way, a user can watch subtitles or logo on the screen of a TV during playback of a DVD title.

Recently, the standardization of new higher density optical discs; for example, blu-ray read-only disc (BD-ROM) has been under development. An effective method of reproducing the subtitles recorded on a BD-ROM in a various ways has not been established.

SUMMARY OF THE INVENTION

A recording medium according to the present invention includes a data structure for managing reproduction of text subtitle data.

In one embodiment, the recording medium stores a main file and at least one separate text file. The main file includes multiplexed audio and video data streams, and the text subtitle file includes a single text subtitle stream.

In one embodiment, the text subtitle file stores the text subtitle stream as transport packets, and each transport packet in the text subtitle stream has a same packet identifier.

In another embodiment, the main file also stores the multiplexed audio and video data streams as transport packets. Here, the packet identifier of the text subtitle stream is distinguishable from packet identifiers for the transport packets in the main file.

In a further embodiment, the main file includes multiplexed audio data, video data and bitmap streams. For example, in one embodiment, the bitmap stream is a bitmap subtitle stream.

The present invention further provides apparatuses and methods for recording and reproducing the data structure according to the present invention. For example in a method of reproducing a recording medium having a data structure for managing a text subtitle, the method includes loading, from the recording medium, a text subtitle file into memory before decoding of a text subtitle stream included in the text subtitle file. Here, the text subtitle file is stored separately from a main file on the recording medium. The main file includes multiplexed audio and video data streams, and the text subtitle file includes a single text subtitle stream.

An example apparatus includes at least a pick-up, a memory and a text processor. The pick-up is for reproducing at least one text subtitle file from the recording medium; the text subtitle file being stored separately from a main file on the recording medium. The main file includes multiplexed audio and video data streams, and the text subtitle file includes a single text subtitle stream. The memory is for storing the reproduced text subtitle file, and the text processor is for decoding the text subtitle stream stored in the memory.

BRIEF DESCRIPTION OF THE DRAWINGS

The accompanying drawings, which are included to provide a further understanding of the invention, illustrate the exemplary embodiments of the invention, and together with the description, serve to explain the principles of the present invention. In the drawings.

DETAILED DESCRIPTION OF THE EXEMPLARY EMBODIMENTS

In order that the invention may be fully understood, exemplary embodiments thereof will now be described with reference to the accompanying drawings.

For an optical disc such as blu-ray read-only disc (BD-ROM) in accordance with the present invention, subtitle data is recorded thereon so as to provide the subtitles associated with main audio and video (A/V) data. The subtitle data is bitmap-formatted or in text form (e.g., character codes). Hereinafter, these two types of subtitle data will be referred to as bitmap subtitle data and text subtitle data, respectively. Both bitmap subtitle data and text subtitle data may be recorded on the optical disc, or either, or neither. Before being recorded on the optical disc, the subtitle data may be multiplexed with the main A/V data.

The bitmap subtitle data or text subtitle data may be supplied from a content provider server (CP server) through networks such as the internet. The text subtitle data from the CP server is transmitted in the MPEG2 transport stream (TS) format or extensible markup language (XML) format. A plurality of the text subtitle data may be sent from the CP server so as to supply subtitles for several different language. Moreover, another type of data stream such as an audio stream may be supplied from the CP server together with the subtitle data.

According to the present invention, the text subtitle data and bitmap subtitle data may be organized on a BD-ROM in different ways, which will be described hereinafter in detail.

Figure 1:
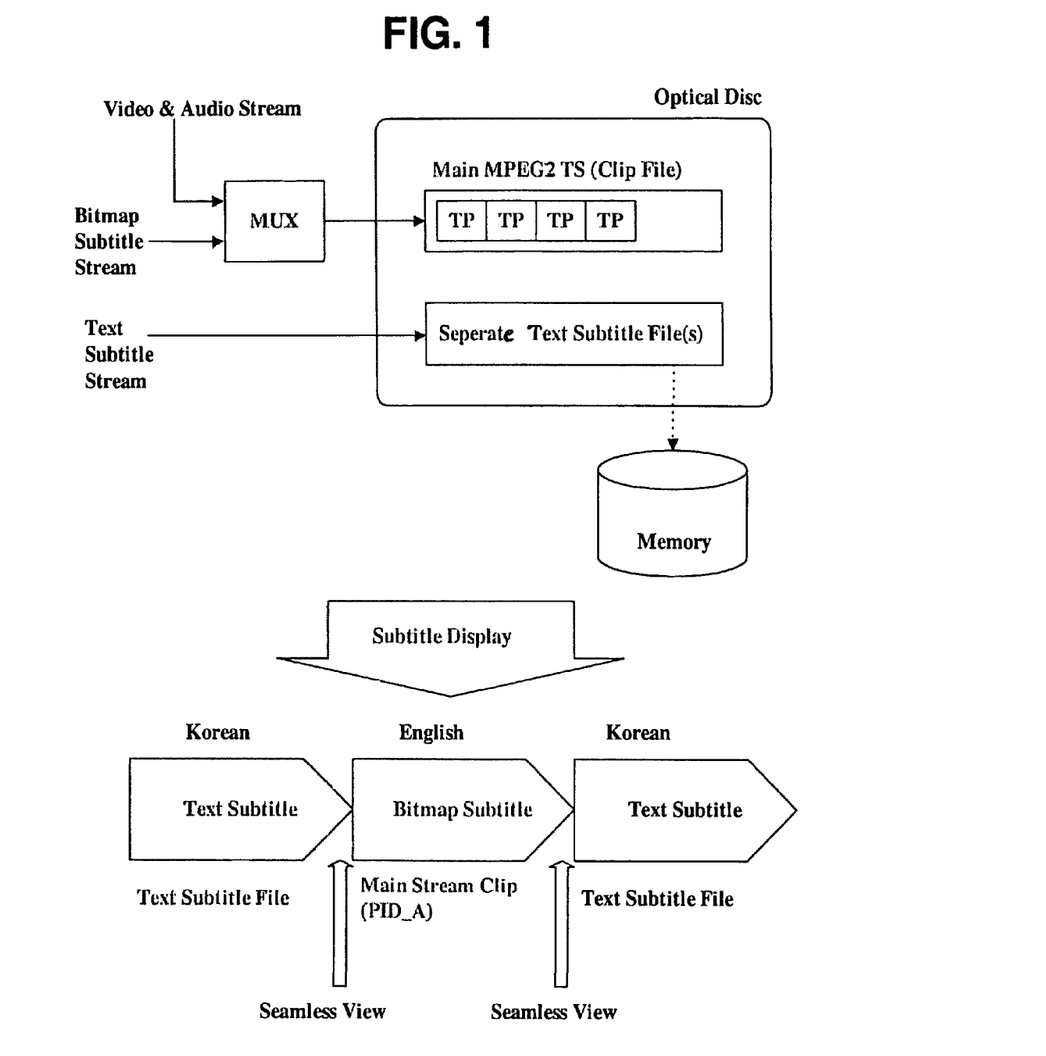
FIGS. 1 to 6 illustrate embodiments of the present invention showing various configurations of bitmap-formatted subtitle stream and text-form subtitle stream on a BD-ROM.

In a first embodiment shown in FIG. 1, both a bitmap subtitle stream and a text subtitle stream are recorded on a BD-ROM as a main subtitle and an auxiliary subtitle, respectively. The bitmap subtitle stream is multiplexed with a main A/V stream and then recorded as a main MPEG2 TS clip file on the BD-ROM. On the other hand, the text subtitle stream is recorded as a text subtitle file separately from the main MPEG2 TS clip file.

When reproduced, the text subtitle stream is uploaded on to a hard disk drive (HDD) or other memory such as a RAM, flash memory, etc., and is then decoded by a text processor (discussed in detail below with respect to FIG. 13). Or, the text subtitle stream may be decoded directly by the text processor without uploading.

The bitmap subtitle stream is recorded on the BD-ROM in a transport packet (TP) format, where the transport packets have a unique packet ID (PID) distinguishable from the PIDs of the main A/V stream. As shown in FIG. 1, the text subtitle and the bitmap subtitle may be used for subtitles of different languages such as Korean and English. While seamless reproduction between the bitmap subtitle and the text subtitle is possible, whether seamless reproduction between the text subtitle streams may be supported or not depends on the optical reproducing apparatus.

Figure 2:
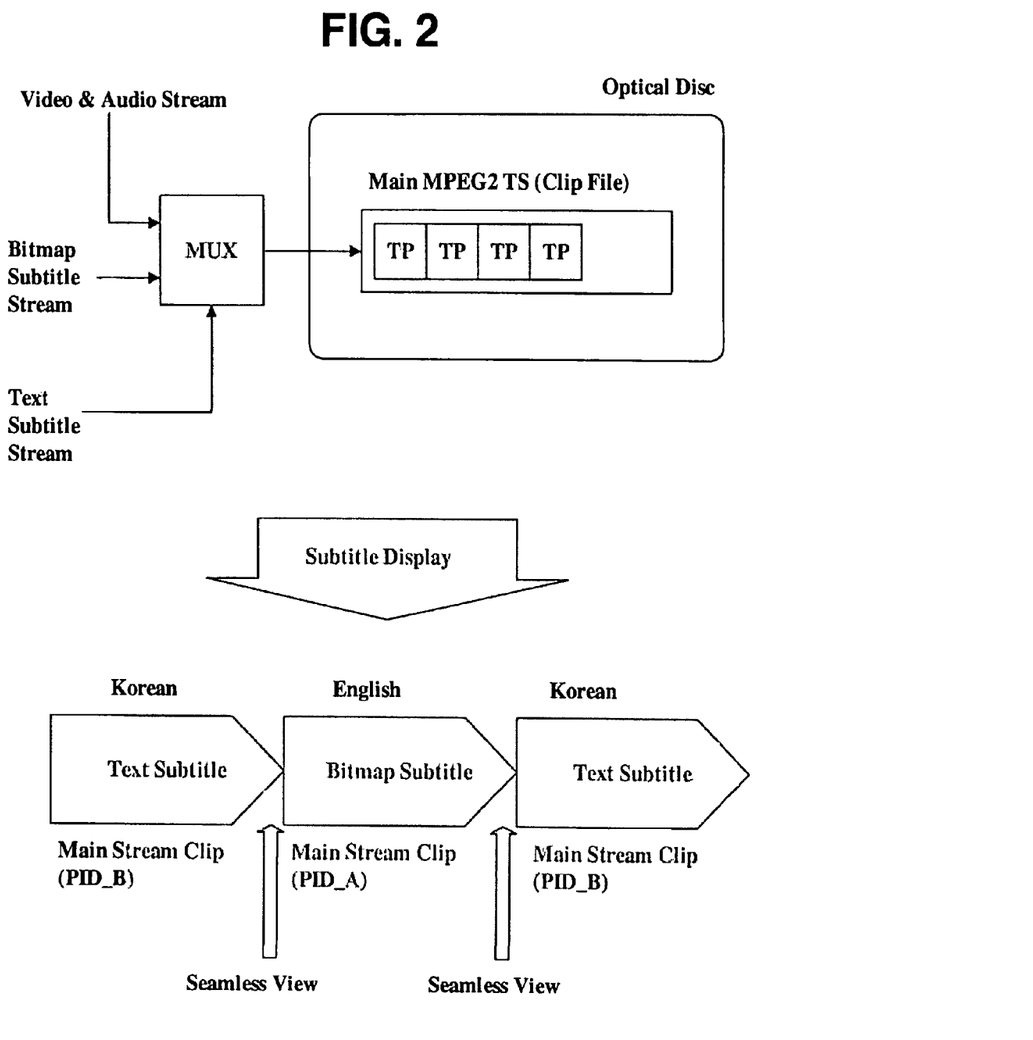

In a second embodiment shown in FIG. 2, both a bitmap subtitle stream and a text subtitle stream are recorded on a BD-ROM in such a way that both streams are multiplexed with the main A/V stream and then recorded as a main MPEG2 TS clip file on the BD-ROM. Both streams are recorded on the BD-ROM in a TP format. The transport packets of each stream have a unique PID distinguishable from PIDs of the main A/V stream. When reproduced, both streams are directly decoded by a text processor without loading into memory in the optical reproducing apparatus.

As shown in FIG. 2, the text subtitle and the bitmap subtitle streams may be used for different languages such as Korean and English. While seamless reproduction between the bitmap subtitle and the text subtitle is possible, whether seamless reproduction between the text subtitle streams may be supported or not depends on the optical reproducing apparatus.

Figure 3:
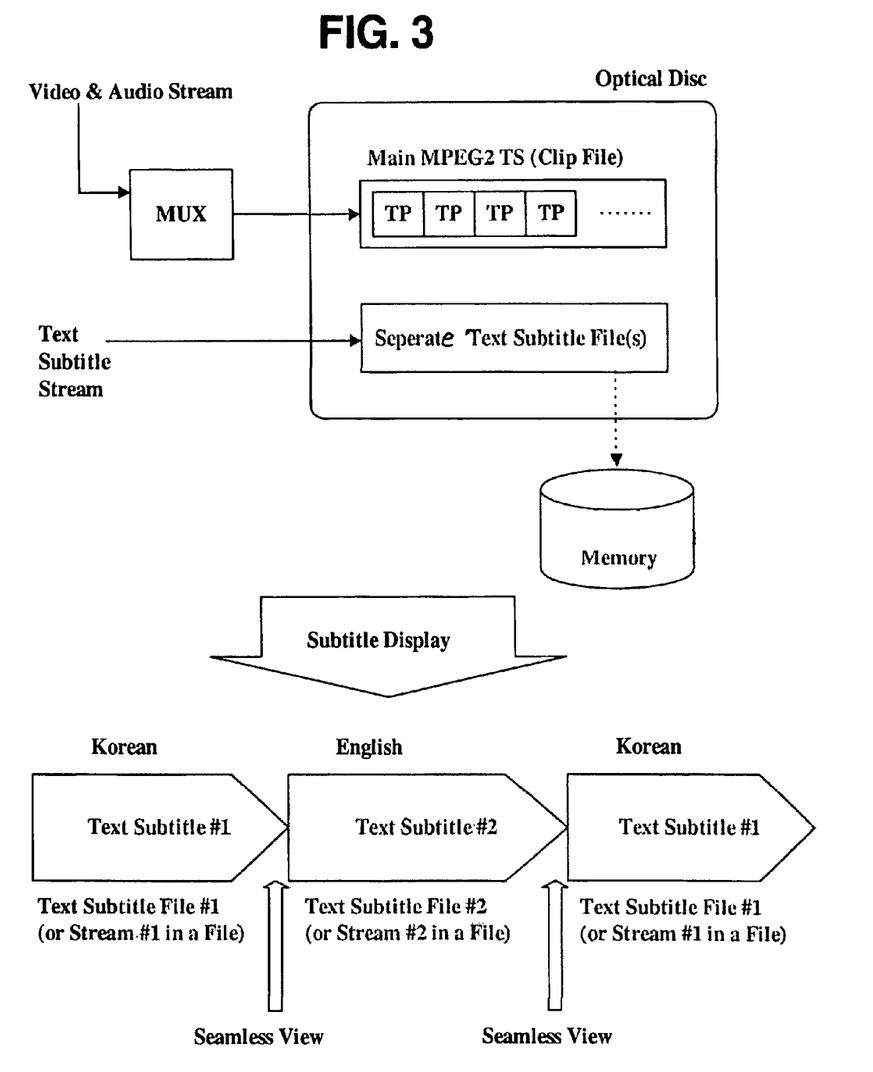

In a third embodiment shown in FIG. 3, the main A/V stream is recorded on a BD-ROM, for example, as a main MPEG2 TS clip file without the bitmap subtitle and the text subtitle stream being multiplexed therewith. The text subtitle stream is recorded as a text subtitle file separately from this main file.

When reproduced, the text subtitle stream is uploaded on a hard disk drive (HDD), or other memory such as a RAM, flash memory, etc., and then decoded by a text processor. Or, the text subtitle stream may be decoded directly by the text processor without uploading.

As shown in FIG. 3, the text subtitle streams for different languages such as Korean and English may be recorded as distinct text subtitle files (text subtitle files #1 and #2, shown in FIG. 3), or may be recorded as distinct streams within a text subtitle file such that seamless reproduction between text subtitle streams of different languages may be performed.

Figure 4:
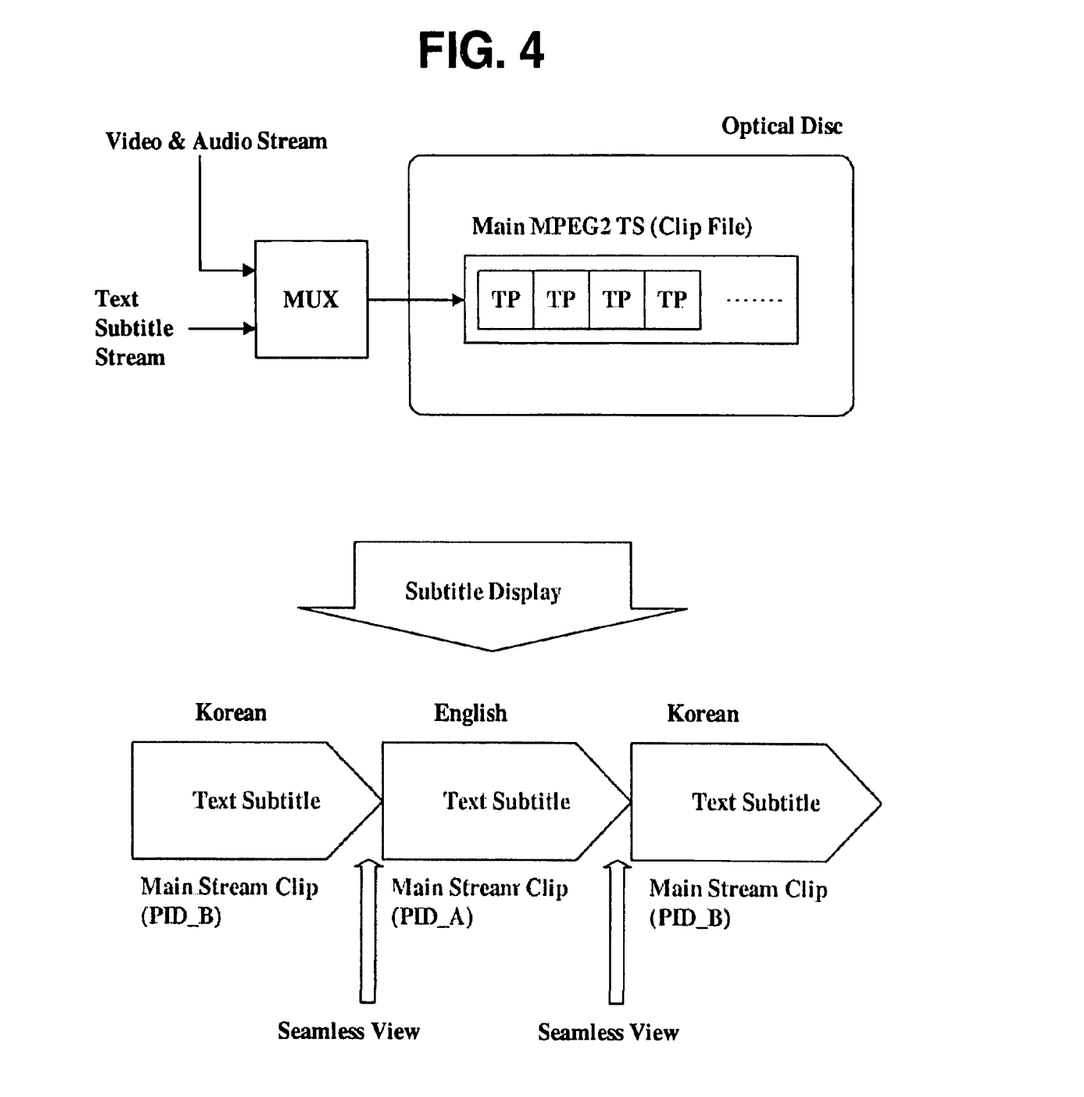

In a fourth embodiment shown in FIG. 4, the text subtitle stream only is multiplexed with a main A/V stream and then recorded as a main MPEG2 TS clip file on a BD-ROM. The text subtitle stream is recorded in a TP format, where the packets have PIDs distinguishable from the PIDs of the main A/V stream. When reproduced, the text subtitle stream is directly decoded by a text processor without loading into a memory in the optical reproducing apparatus.

As shown in FIG. 4, the text subtitle streams for different languages have distinct PIDs such that seamless reproduction between the text subtitle streams of different languages may be performed.

Figure 5:
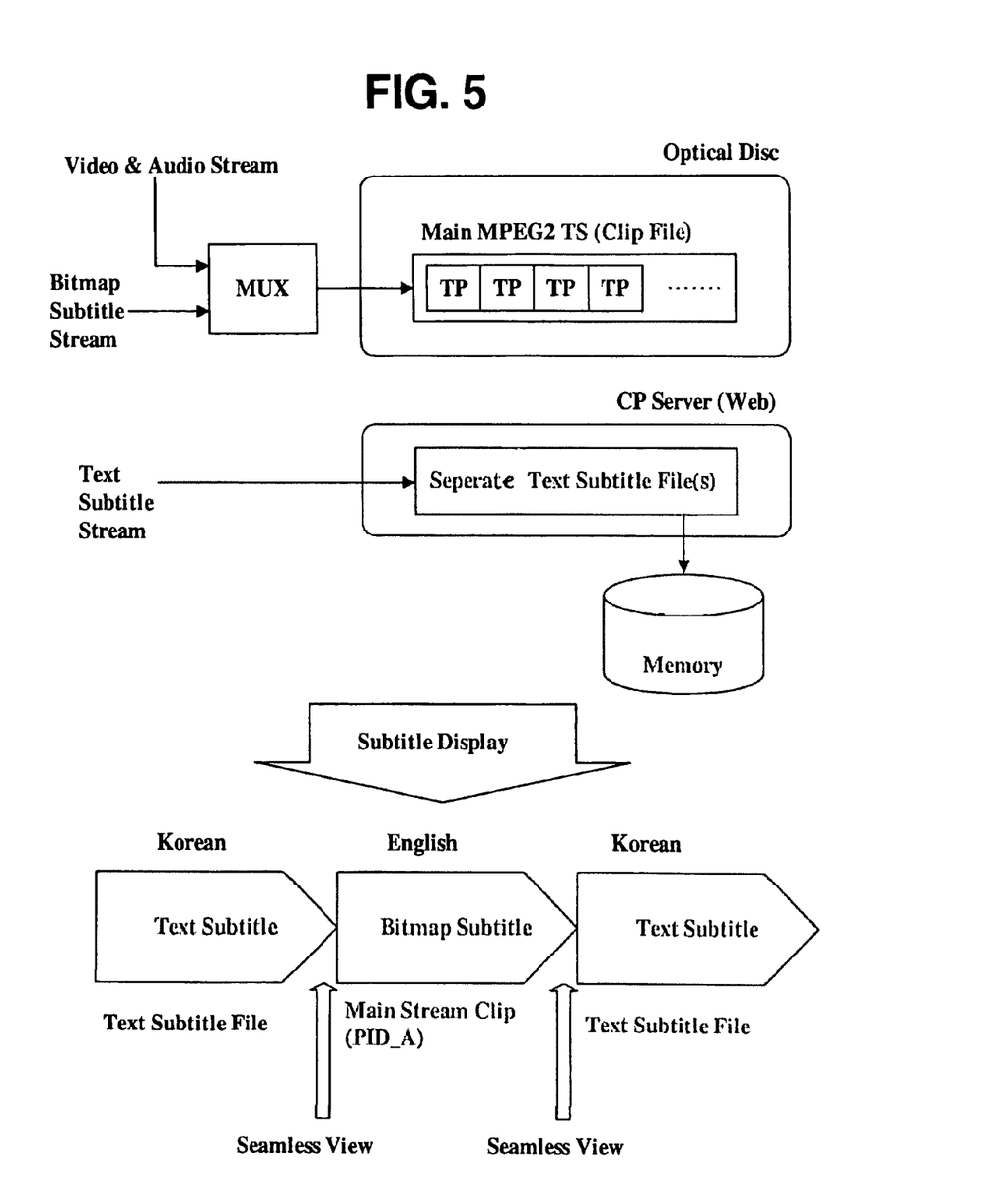

In a fifth embodiment shown in FIG. 5, the bitmap subtitle stream only is multiplexed with a main A/V stream and then recorded as a main MPEG2 TS clip file on a BD-ROM. The bitmap subtitle stream is recorded in a TP format, where the packets have a unique PID distinguishable from the PIDs of the main A/V stream. In this embodiment, a text subtitle stream is supplied as a separate text subtitle file from a CP server that is connected via networks such as the internet to the reproducing apparatus (an example of which is described in detail below with respect to FIG. 12).

To be reproduced, the text subtitle stream is uploaded on a hard disk drive (HDD) or other memory such as a RAM, flash memory, etc. and then decoded by a text processor. As shown in FIG. 5, the bitmap subtitle stream and text subtitle stream, each having different languages, may be reproduced seamlessly. It depends on the optical reproducing apparatus whether or not seamless reproduction between the text subtitle streams may be supported.

Figure 6:
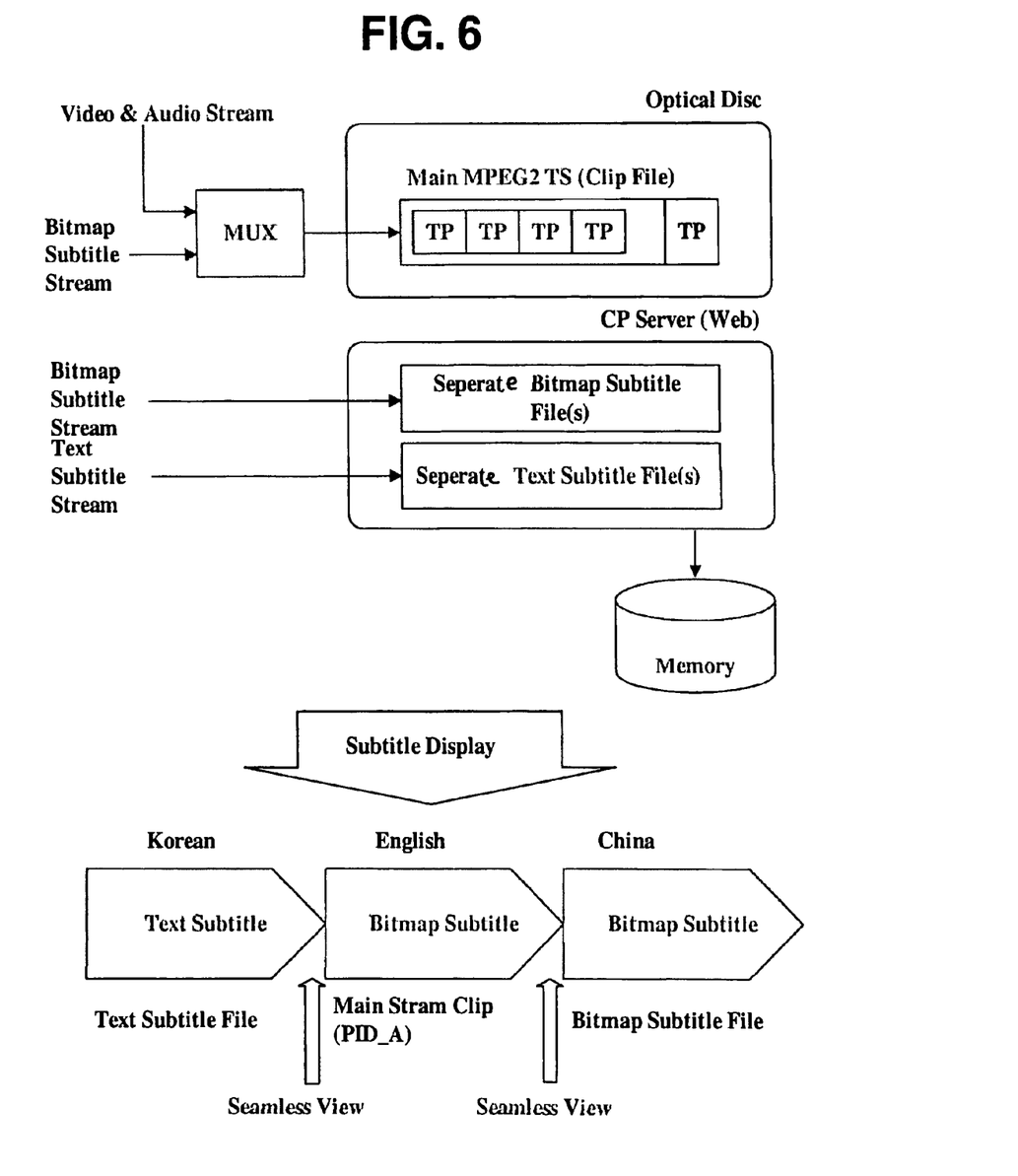

In a sixth embodiment shown in FIG. 6, the bitmap subtitle stream only is multiplexed with a main A/V stream and then recorded as a main MPEG2 TS clip file on a BD-ROM. The bitmap subtitle stream is recorded in a TP format, where the packets have a PID distinguishable from the PIDs of the main A/V stream. In this embodiment, a text subtitle stream is supplied as a separate text subtitle file from a CP server that is connected via networks such as the internet to the reproducing apparatus. Beside the text subtitle stream, another bitmap subtitle stream is supplied from the CP server as a separate bitmap subtitle file.

For the subtitle streams from the CP server to be reproduced, the streams are uploaded on a hard disk drive (HDD) or other memory such as a RAM, flash memory, etc. and then decoded by a text processor. The bitmap subtitle stream on the BD-ROM and the bitmap and text subtitle streams from the CP server may be used for the subtitles of different languages such as Korean, English, and Chinese, and may reproduced seamlessly, as shown in FIG. 6.

Other embodiments of the present invention may be created from combinations of the foregoing embodiments. For example, the bitmap subtitle streams and the text subtitle streams may be supplied from both a BD-ROM and a CP server.

A plurality of the text subtitle streams may also be written on a BD-ROM in various ways and the writing formats will be described below in detail.

Figure 7:
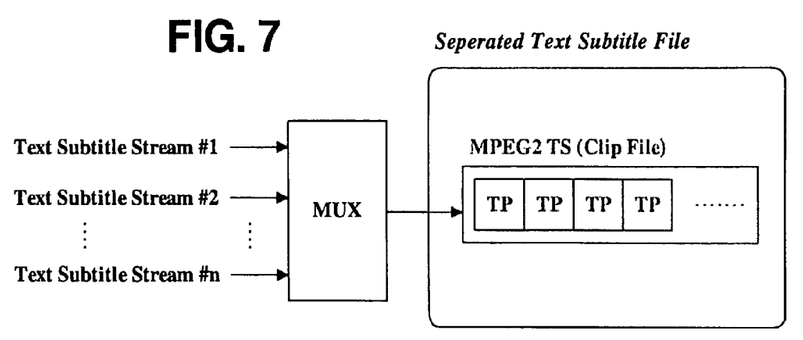
FIGS. 7 to 12 illustrate embodiments of the present invention showing different writing schemes of a plurality of text subtitle streams separately from a main A/V stream.

As shown in FIG. 7, a plurality of text subtitle streams (text subtitle streams #1 to #n) are multiplexed with each other and are then written as a single MPEG2 TS stream clip file. Each text subtitle stream has a unique PID so that each stream may be distinguished from each other. The single MPEG2 TSP clip file may contain the total text subtitle streams or some text subtitles that need to be uploaded or downloaded.

Figure 8:
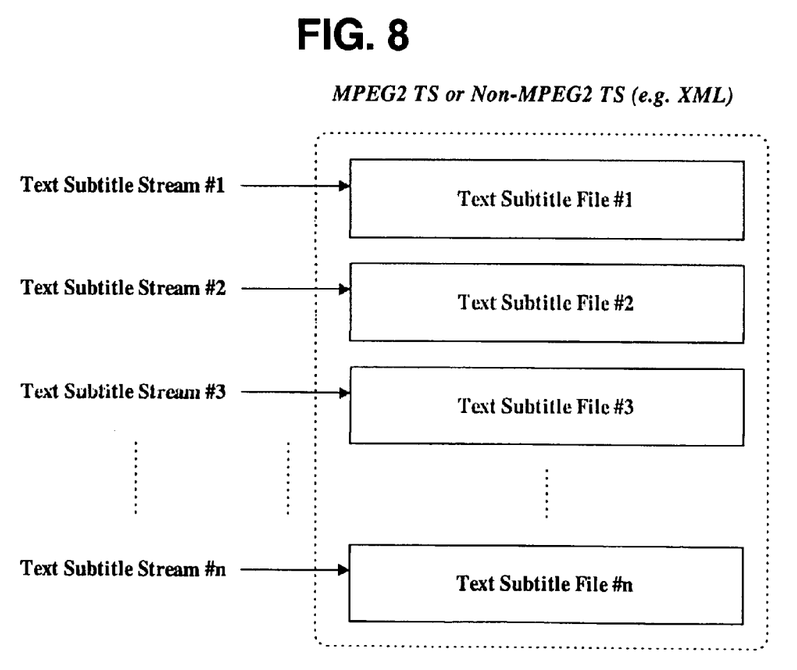

According to the writing formats of FIG. 8, a plurality of text subtitle streams (text subtitle streams #1 to #n) are written as individual files, each being in accordance with either the MPEG2 TS stream format or non-MPEG2 TS format such as XML. In either case, each text subtitle stream is distinguishable and chosen selectively by referencing the corresponding text subtitle files so as to determine text subtitle streams to be uploaded or downloaded.

Figure 9:
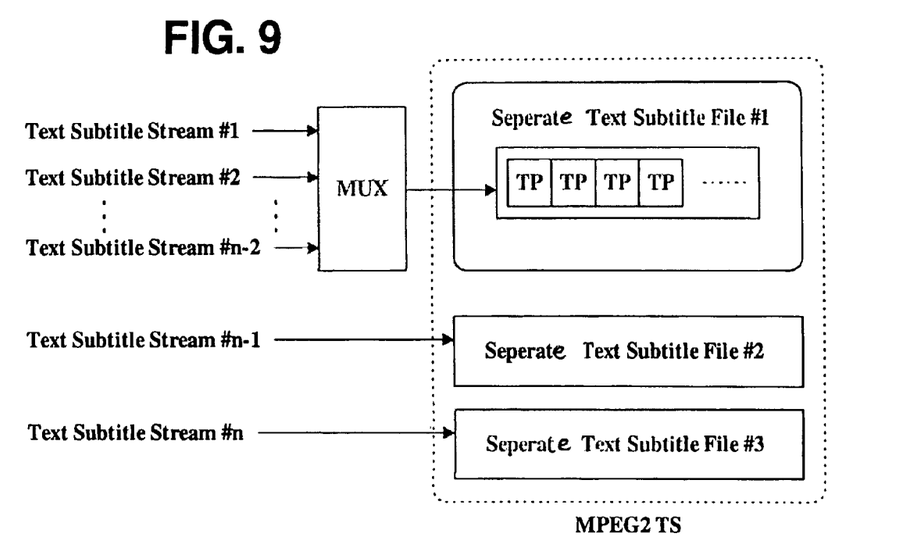

According to the writing formats of FIG. 9, a portion of a plurality of the text subtitle streams (text subtitle streams #1 to #(n−2)) are multiplexed with each other and are then written as a single MPEG2 TS stream file. Each text subtitle stream has a unique PID so that each stream may be distinguished from the other. The other portions of the plurality of the text subtitle streams (text subtitle streams #(n−1) to #n) are written as individual MPEG2 TS stream files without insertion of unique PIDs.

Figure 10:
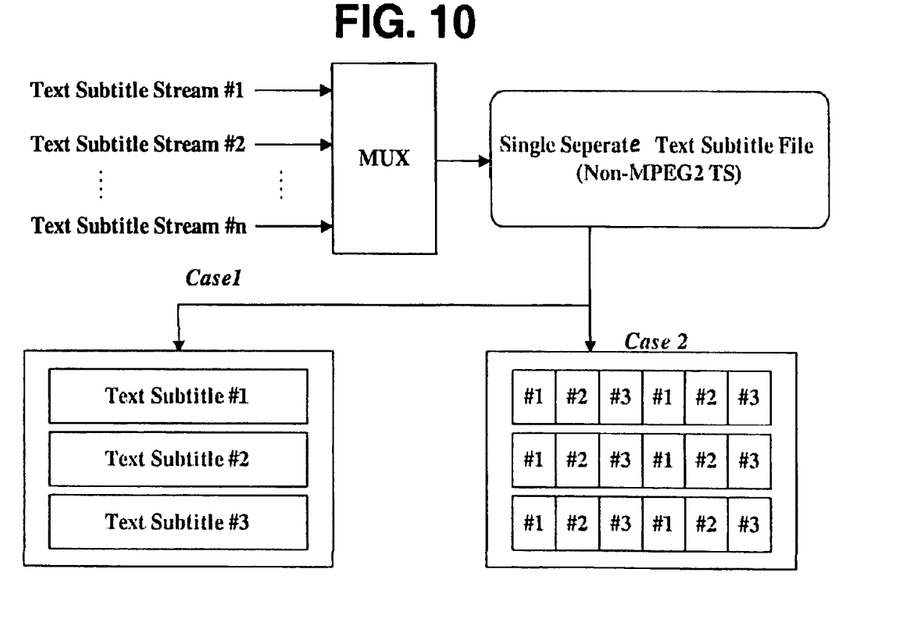

According to the writing formats of FIG. 10, a plurality of the text subtitle streams (text subtitle streams #1 to #n) are written as a single non-MPEG2 TS file. Each text subtitle stream may be organized separately or intermixed within the non-MPEG2 TS file.

Figure 11:
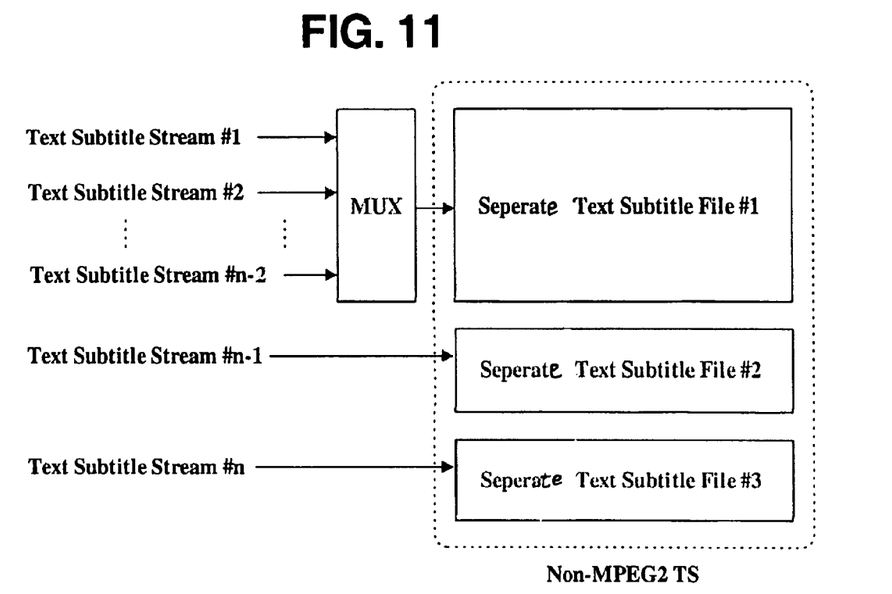

According to the writing formats of FIG. 11, a portion of a plurality of the text subtitle streams (text subtitle streams #1 to #(n−2)) are multiplexed with each other and are then written as a single non-MPEG2 TS file. The other portion of the plurality of the text subtitle streams (text subtitle streams #(n−1) to #n) are written as individual non-MPEG2 TS files, separately.

Figure 12:
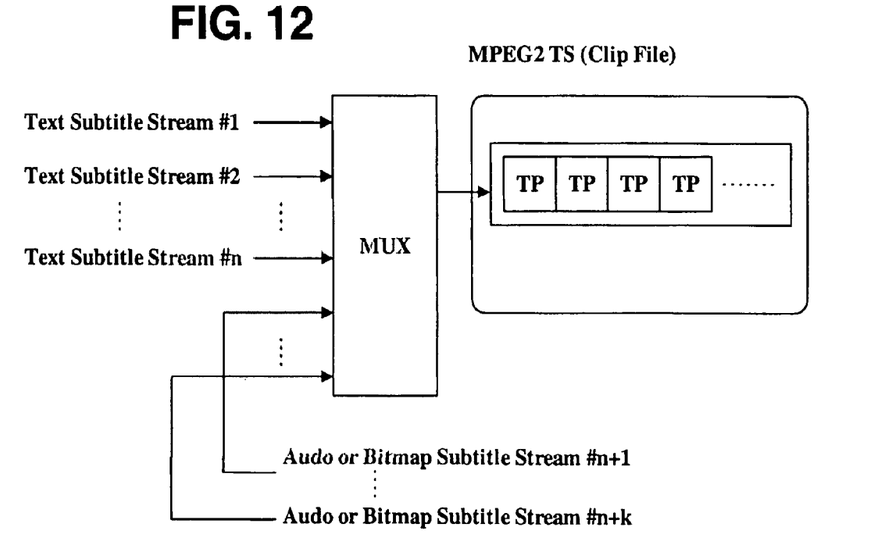

According to the writing formats of FIG. 12, when one or more audio or bitmap subtitle streams need to be reproduced together with text subtitle streams, a plurality of the text subtitle streams (text subtitle streams #1 to #n) are multiplexed with the audio or bitmap subtitle streams and then written as a single MPEG2 TS stream clip file. In this case, a user can choose subtitle and audio selection in any combination desired, for example, Korea sound and Korean text or bitmap subtitle, English audio and Korean text or bitmap subtitle for English listening practice, or English text subtitle and Korean bitmap subtitle for multiple language subtitles.

Figure 13:
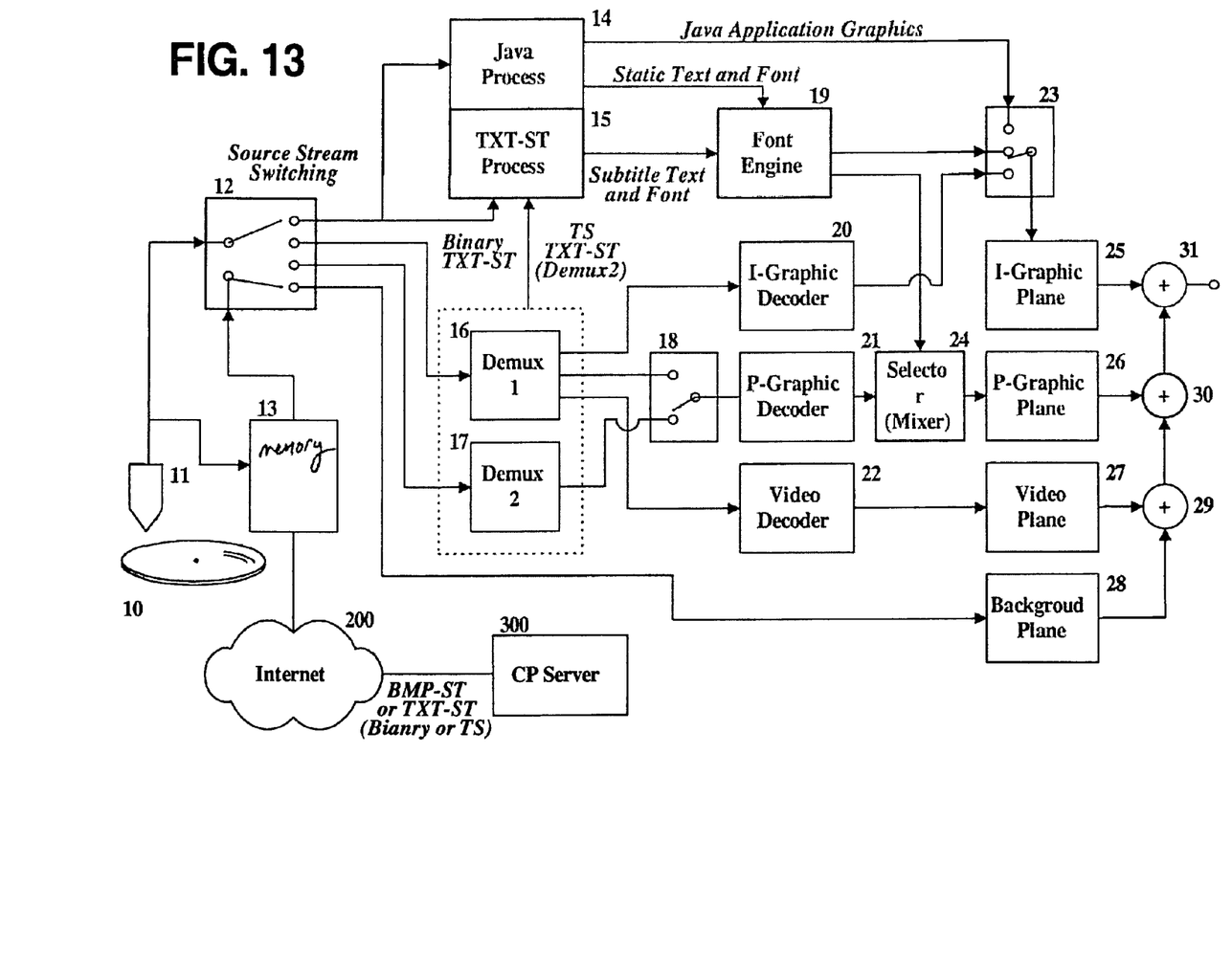
FIG. 13 illustrates a block diagram of an embodiment of the optical disc reproducing apparatus according to the present invention.

FIG. 13 illustrates an optical disc reproducing apparatus according to an embodiment of the present invention. As shown, the apparatus includes an optical pickup 11 for reading out data from a BD-ROM 10; a source stream switch 12; a memory 13; a Java processor 14; a text subtitle processor 15; a first demultiplexer (demux) 16; a second demultiplexer (demux) 17; a presentation graphic source switch 18; a font engine 19; an interactive graphic decoder 20; a presentation graphic decoder 21; a video decoder 22; an interactive graphic data switch 23; a presentation graphic data selector 24; an interactive graphic plane 25; a presentation graphic plane 26; a video plane 27; a background plane 28; and several mixers 29, 30, 31.

The optical disc reproducing apparatus may be connected to a CP sever 300 through the internet 200. The CP server 300 supplies bitmap subtitle streams or text subtitle streams that may be in the MPEG2 TS stream format or a predetermined binary stream of XML format.

The text subtitle stream from the CP server 300 may be a multiplexed stream of multiple language text subtitle streams only or a multiplexed stream of text subtitle streams and audio streams. The bitmap or text subtitle streams supplied from the CP server are uploaded to memory 13, which is a HDD, RAM, flash memory, etc.

The decoding process of the bitmap and text subtitle streams will be described below in detail. A text subtitle stream recorded on a BD-ROM in the MPEG2 TS stream format separately from main A/V stream is read out from the BD-ROM and may then be uploaded to the memory 13. The text subtitle stream is then supplied to the text subtitle processor 15 through the source stream switch 12 and the second demux 17. The text subtitle processor 15 may be configured as a component of the Java processor 14 or a separate text processor as shown.

Based on the text subtitle stream processed by the text subtitle processor 15, font presentation graphic data are generated from the font engine 19 and then input to the presentation graphic data selector 24. Presentation graphic data corresponding to, e.g., a bitmap subtitle stream may also be supplied to the presentation graphic data selector 24 from the memory 13 through the switch 12, the first demux 16 or second demux 17, the presentation graphic source switch 18 and the presentation graphic decoder 21. As will be appreciated, the presentation graphic decoder 21 decodes the presentation graphic data. The presentation graphic data selector 24 in one embodiment selectively chooses one of the presentation graphic data from the font engine 19 (text subtitle graphic data) or from the presentation graphic decoder 21 (bitmap subtitle graphic data), and supplies this data to the presentation graphic plane 26.

Meanwhile, reproduced background data (if any) is supplied by the switch 12 to a background plane 28, and reproduced A/V data is supplied by the switch 12 to the video decoder 22 via the first demux 16. The video decoder 22 decodes the A/V data. The mixer 29 mixes the decoded A/V data with the background data (if any). The mixer 30 mixes the output of the mixer 29 with the output from the presentation graphic plane 26.

In this manner, either bitmap subtitles or text subtitles may be displayed together with main video pictures. As alluded to before, both the text subtitle stream and the bitmap subtitle stream may be supplied from the CP server 300.

When a text subtitle stream has been recorded on a BD-ROM in a predefined binary format such as XML, the text subtitle stream is uploaded to the memory 13 and then supplied directly to the text subtitle processor 15 bypassing the second demux 17. Based on the output of the text subtitle processor 15, font presentation graphic data are generated from the font engine 19 and then input to the presentation graphic data selector 24. Here, either presentation graphic data from the font engine 19 (text subtitle graphic data) or from the presentation graphic decoder 21 (bitmap subtitle graphic data) is chosen selectively as output. The output of the presentation graphic data selector 24 is supplied to the presentation graphic plane 26 so that either bitmap subtitles or text subtitles may be displayed together with main video pictures. This is accomplished by mixer 30 which mixes the output from mixer 29 and the presentation graphics plane 26. Also, both or either of the text subtitle stream and bitmap subtitle streams may be supplied from the CP server 300.

Interactive graphic data such as menu selector button are supplied to the interactive graphic decoder 20 through the demux 16, and the output of the interactive graphic decoder 20 is input to the interactive graphic data switch 23. Interactive graphic data may also be supplied from the Java processor 14 and/or the font engine 19, and are input to the interactive graphic data switch 23. The interactive graphic data switch 23 determines which input is chosen as an output to the interactive graphic plane 25. The output from the interactive graphics plane 25 is then mixed by mixer 31 with the output from mixer 30.

Figure 14:
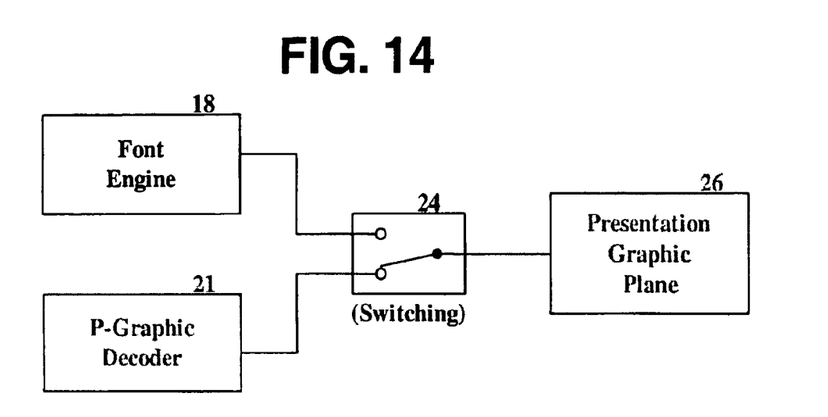
FIGS. 14 to 16 illustrate block diagrams of embodiments of partial components of the optical disc reproducing apparatus according to the present invention.
Figure 15:
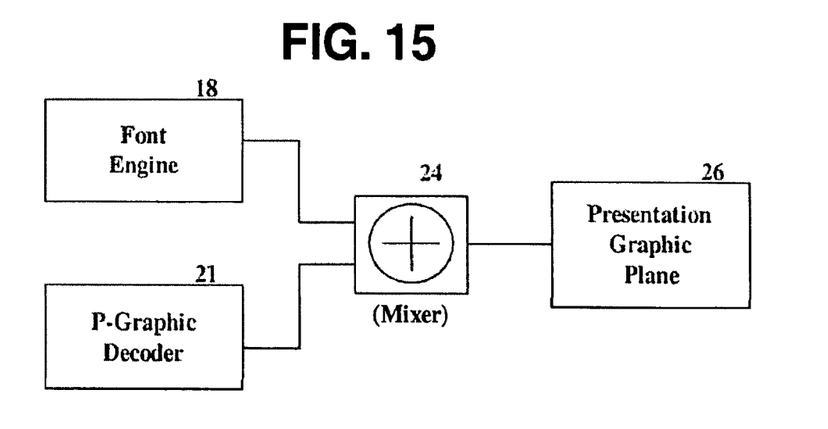
Figure 16:
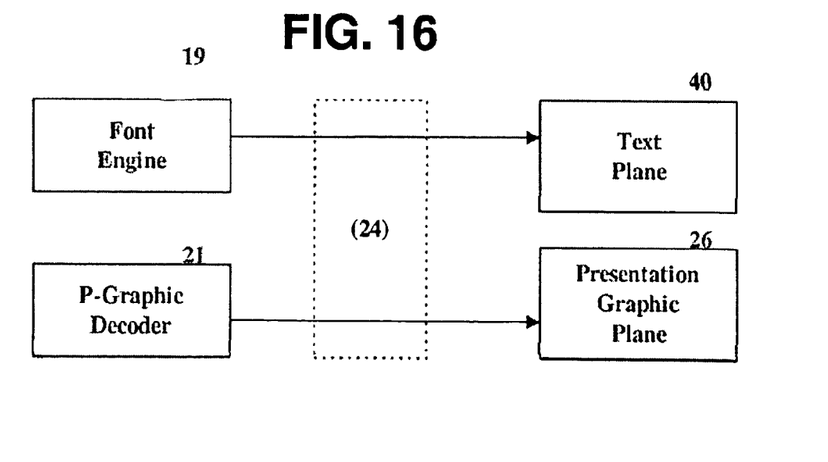

The interactive graphic data selector 24 may be implemented as a switch or as a mixer, as shown in FIGS. 14 and 15, respectively. To be specific, while a text subtitle and a bitmap subtitle may not be displayed simultaneously if the switch embodiment is adopted, the mixer embodiment enables the two subtitles to be displayed simultaneously on non-overlapping regions of a screen. Furthermore, instead of using the interactive graphic data selector 24, a text presentation plane 40 may be additionally used as shown in FIG. 16 so as to display the text subtitle supplied from the font engine 19. As will be appreciated, this embodiment also uses an additional mixer to mix the output from the text presentation plane 40 and the mixer 31. In the configuration of FIG. 16, the text subtitles and bitmap subtitles may be displayed independently of each other.

The present invention provides a recording medium having a data structure for managing the reproduction of subtitle data, and provides methods and apparatuses for recording the data structure on the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disc having a data structure for managing a text subtitle, the optical disc comprising:
   a recording area storing a main file and at least one separate text subtitle file,
   the main file including at least one of audio and video data streams as transport packets and bitmap subtitle stream as transport packets that have a unique packet identifier distinguishable from a packet identifier of the at least one of audio and video data streams, and
   each separate text subtitle file including a single text subtitle stream as transport packets, the transport packets of the text subtitle stream having a packet identifier that is distinguishable from the packet identifier of the at least one of audio and video data streams, and the text subtitle stream having the transport packets with a same packet identifier,
   wherein the bitmap subtitle stream and the at least one of audio and video data streams are multiplexed in the main file while the text subtitle stream is separate from the main file,
   wherein either the text subtitle stream or the bitmap subtitle stream is reproduced together with the at least one of audio and video data streams, both of the text subtitle stream and the bitmap subtitle stream not being reproduced at the same time,
   wherein if the bitmap subtitle stream is used for a display of the subtitle, the bitmap subtitle stream is reproduced together with the at least one of audio and video data streams by using the main file, wherein if the text subtitle stream is used for a display of the subtitle, the text subtitle stream is reproduced together with the at least one of audio and video data streams by using the main file and the at least one separate text subtitle file.

2. The optical disc of claim 1, wherein one of the at least one separate text subtitle file stores a text subtitle stream for one language text subtitle, and another of the at least one separate text subtitle file stores a text subtitle stream for a different language text subtitle.

3. The optical disc of claim 1, wherein the text subtitle stream is supplied from a content provider through networks.

4. The optical disc of claim 1, wherein the optical disc is a blu-ray disc.

5. A method for reproducing a subtitle that is one of at least one bitmap subtitle stream and at least one text subtitle stream, comprising:
   loading at least one of the bitmap subtitle stream and the text subtitle stream, the bitmap subtitle stream being multiplexed with at least one of audio and video data streams included as transport packets in a main file and the transport packets of the bitmap subtitle stream having a unique packet identifier distinguishable from a packet identifier of the at least one of audio and video data streams, and the text subtitle stream included in at least one text subtitle file being separate from the main file, each separate text subtitle file including a single text subtitle stream as transport packets, and the transport packets of the text subtitle stream having a same packet identifier distinguishable from the packet identifier for the transport packets in the main file; and
   selecting and reproducing either the bitmap subtitle stream or the text subtitle stream together with the at least one of audio and video data streams, both of the text subtitle stream and the bitmap subtitle stream not being reproduced at the same time,
   wherein if the bitmap subtitle stream is used for a display of the subtitle, the bitmap subtitle stream is reproduced together with the at least one of audio and video data streams by using the main file, wherein if the text subtitle stream is used for a display of the subtitle, the text subtitle stream is reproduced together with the at least one of audio and video data streams by using the main file and the at least one separate text subtitle file.

6. The method of claim 5, wherein one of the at least one separate text subtitle files stores a text subtitle stream for one language text subtitle, and another of the at least one separate text subtitle files stores a text subtitle stream for a different language text subtitle.

7. The method of claim 5, further comprising:
   recording each text subtitle file as a distinct file including the text subtitle stream for a different language, and
   performing seamless reproduction between text subtitle streams of different languages.

8. The method of claim 5, wherein the loading step loads at least one of the bitmap subtitle stream and the text subtitle stream in a MPEG2 format transport stream from at least one of a content provider through networks and an optical disc.

9. The method of claim 5, wherein the processing step comprises:
   generating presentation graphic data based on the processed text subtitle stream when the text subtitle stream is loaded; and
   inputting the generated presentation graphic data to a presentation graphic plane.

10. The method of claim 9, wherein the processing step comprises:
    decoding the bitmap subtitle stream to presentation graphic data when the bitmap subtitle stream is loaded; and
    inputting the decoded presentation graphic data to a presentation graphic plane.

11. An apparatus for reproducing a subtitle that is one of at least one bitmap subtitle stream and at least one text subtitle stream, comprising:
    a pick up configured to read at least one of the bitmap subtitle stream and the text subtitle stream from an optical disc;
    a memory, coupled to the pickup, configured to load at least one of the bitmap subtitle stream and the text subtitle stream read by the pickup;
    wherein the bitmap subtitle stream is multiplexed with the at least one of audio and video data streams in a main file and transport packets of the bitmap subtitle stream have a unique packet identifier distinguishable from a packet identifier of the at least one of audio and video data streams,
    the text subtitle stream being included in at least one text subtitle file that is separate from the main file, each text subtitle file including a single text subtitle stream as transport packets, and the transport packets of the text subtitle stream having a same packet identifier that is distinguishable from the packet identifier for the transport packets in the main file;

a processor configured to decode the text subtitle stream from the memory;

a decoder configured to decode the bitmap subtitle stream; and a selector, coupled to the processor and the decoder, configured to select the text subtitle stream or the bitmap subtitle stream, wherein either the text subtitle stream or the bitmap subtitle stream is supplied to a presentation graphic plane to be reproduced together with the at least one of audio and video data streams, both of the text subtitle stream and the bitmap subtitle stream not being reproduced at the same time, wherein if the bitmap subtitle stream is used for a display of the subtitle, the bitmap subtitle stream is reproduced together with the at least one of audio and video data streams by using the main file, wherein if the text subtitle stream is used for a display of the subtitle, the text subtitle stream is reproduced together with the at least one of audio and video data streams by using the main file and the at least one text subtitle file.

12. The apparatus of claim 11, wherein the memory is further configured to load at least one of the bitmap subtitle stream and the text subtitle stream in a MPEG2 format transport stream from a content provider through networks.

13. The apparatus of claim 11, wherein the optical disc is a blu-ray disc.

14. A method of recording a data structure for managing reproduction of a subtitle on an optical disc, the subtitle being one of at least one bitmap subtitle stream and at least one text subtitle stream, the method comprising:

generating the bitmap subtitle stream and the text subtitle stream;

the bitmap subtitle stream including transport packets which have a unique packet identifier distinguishable from a packet identifier of at least one of audio and video data streams in a main file;

the text subtitle stream included in at least one text subtitle file, each text subtitle file including a single text subtitle stream as transport packets, the transport packets of the text subtitle stream having a same packet identifier that is distinguishable from the packet identifier for the transport packets in the main file; and recording the bitmap subtitle stream multiplexed with the at least one of audio and video data streams in the main file and the text subtitle stream as a separate text subtitle file from the main file on the optical disc, wherein either the text subtitle stream or the bitmap subtitle stream is displayed together with the at least one of audio and video data streams, both of the text subtitle stream and the bitmap subtitle stream not being presented at the same time.

15. The method of claim 14, wherein one of the at least one text subtitle files stores a text subtitle stream for one language text subtitle, and another of the at least one separate text subtitle files stores a text subtitle stream for a different language text subtitle.

16. The method of claim 14, wherein prior to the generating step, the method comprises:

loading at least one of the bitmap subtitle stream and the text subtitle stream in a MPEG2 format transport stream from a content provider through networks.

17. An apparatus for recording a data structure for managing reproduction of a subtitle on an optical disc, the subtitle being one of at least one bitmap subtitle stream and at least one text subtitle stream comprising:

an optical pickup configured to record the bitmap subtitle stream multiplexed with at least one of audio and video data streams in the main file and the text subtitle stream as a separate text subtitle file, the bitmap subtitle stream including transport packets which have a unique packet identifier distinguishable from a packet identifier of the at least one of audio and video data streams in the main file, the text subtitle file including a single text subtitle stream as transport packets and the transport packets of the text subtitle stream having a same packet identifier which is distinguishable from the packet identifier for the transport packets in the main file; and a controller configured to control the optical pickup to record the at least one text subtitle stream and the at least one bitmap subtitle stream on the optical disc, wherein either the text subtitle stream or the bitmap subtitle stream is to be selected and reproduced together with the at least one of audio and video data streams, both of the text subtitle stream and the bitmap subtitle stream not being reproduced at the same time.

18. The apparatus of claim 17, wherein the apparatus further comprises:

a memory configured to store at least one of the bitmap subtitle stream and the text subtitle stream in a MPEG2 format transport stream from a content provider through networks.

* * * * *